(12) United States Patent
Pritchard et al.

(10) Patent No.: US 11,480,956 B2
(45) Date of Patent: Oct. 25, 2022

(54) COMPUTING AN EXPLAINABLE EVENT HORIZON ESTIMATE

(71) Applicant: Falkonry Inc., Sunnyvale, CA (US)

(72) Inventors: Peter Nicholas Pritchard, Sunnyvale, CA (US); Beverly Klemme, San Jose, CA (US); Daniel Kearns, Half Moon Bay, CA (US); Nikunj R. Mehta, Cupertino, CA (US); Deeksha Karanjgaokar, Sunnyvale, CA (US)

(73) Assignee: FALKONRY INC., Cupertino, CA (US)

( * ) Notice: Subject to any disclaimer, the term of this patent is extended or adjusted under 35 U.S.C. 154(b) by 11 days.

(21) Appl. No.: 17/071,216

(22) Filed: Oct. 15, 2020

(65) Prior Publication Data

US 2022/0121194 A1    Apr. 21, 2022

(51) Int. Cl.
*G05B 23/02* (2006.01)
*G06N 20/00* (2019.01)
*G06K 9/62* (2022.01)

(52) U.S. Cl.
CPC ..... *G05B 23/0283* (2013.01); *G05B 23/0254* (2013.01); *G06K 9/6257* (2013.01); *G06N 20/00* (2019.01)

(58) Field of Classification Search
CPC ............ G05B 23/0283; G05B 23/0254; G06K 9/6257; G06N 20/00
See application file for complete search history.

(56) References Cited

U.S. PATENT DOCUMENTS

| | | | |
|---|---|---|---|
| 10,671,039 B2* | 6/2020 | Herzog | G05B 23/024 |
| 10,706,329 B2* | 7/2020 | Anushiravani | G06N 5/003 |
| 10,976,410 B1* | 4/2021 | Wang | G01S 17/931 |
| 11,245,638 B2* | 2/2022 | Gusat | H04L 47/826 |
| 2020/0134430 A1* | 4/2020 | Yamashita | G06K 9/6257 |
| 2020/0225655 A1* | 7/2020 | Cella | G05B 23/024 |
| 2020/0292608 A1* | 9/2020 | Yan | G06N 3/0445 |
| 2021/0173357 A1* | 6/2021 | Hirano | G06N 5/04 |
| 2022/0058325 A1* | 2/2022 | Lin | G06N 20/00 |
| 2022/0058669 A1* | 2/2022 | Yin | G06Q 30/0202 |

OTHER PUBLICATIONS

The International Searching Authority, "Search Report" in Application No. PCT/US21/53363, dated Jan. 12, 2022, 11 pages.

* cited by examiner

*Primary Examiner* — Mohammad K Islam
(74) *Attorney, Agent, or Firm* — Hickman Becker Bingham Ledesma LLP (57) ABSTRACT

A method for generating forecast predictions that indicate an event horizon of an entity or remaining useful life of a consumable using machine learning techniques is provided. Using a server computer system, feature data comprising features vectors that represent a set of signal data over a range of time is stored. Condition data comprising conditions occurring on the entity at particular moments in time is stored. Label data that comprises a plurality of time values that each indicate a difference in time between one condition and another condition is stored. A training dataset is created by combining the feature data, the condition data, and the label data into a single dataset. The training dataset is partitioned by condition. A machine learning model is trained on each target condition training dataset. The trained machine learning models are used to generate forecast values that each indicate an amount of time to an occurrence of a target condition associated with an entity.

24 Claims, 6 Drawing Sheets

Store, in one or more data repositories, feature data comprising one or more feature vectors, the one or more feature vectors representing one or more sets of signal data over a particular range of time, each set of signal data of the one or more sets of signal data associated with a particular moment in time, the one or more sets of signal data representing observed data values from one or more sensors that are attached to one or more entities, the one or more feature vectors generated based on combining the one or more sets of signal data into the one or more feature vectors
205

Store, in one or more data repositories, condition data comprising a plurality of conditions occurring on the one or more entities at particular moments in time, the plurality of conditions determined based on the one or more feature vectors
210

Store, in one or more data repositories, label data comprising a plurality of time values, each time value of the plurality of time values indicating a difference in time between an occurrence of a first condition of the plurality of conditions and an occurrence of a second condition of the plurality of conditions
215

Create a training dataset comprising the feature data, the condition data, and the label data
220

COMPUTING AN EXPLAINABLE EVENT HORIZON ESTIMATE

FIELD OF THE DISCLOSURE

The disclosure generally relates to computer-integrated manufacturing and computerized maintenance management systems for apparatus such as industrial machines. The disclosure relates more specifically to using advanced machine learning techniques to accurately predict event horizons of physical systems, such as chemical processes and machines, and remaining useful life of consumables based on signal data received from the operation of such physical systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Power plants, wastewater treatment plants, factories, airplanes, and automobiles are some examples of complex systems that include multiple machines operating to accomplish objectives. Such complex systems have a period of time where they are useful and serviceable. During this period of time, there are numerous situations wherein such complex systems may fail to operate at an optimum level, resulting in any or all of (1) reduced output, (2) degradation of quality, (3) delays in output, (4) injury or loss of human lives, or (5) irreversible damage to the equipment or the environment.

Complex systems that are equipped with smart sensors or supervisory control and data acquisition (SCADA) systems primarily employ rule-based alerting systems. Such rule-based alerting systems can identify impending failure or other conditions by comparing the output values from sensors that are mounted on the machines to preset rules to produce displays, indicators, or output data streams.

In order to prevent an equipment failure, a process failure or other undesirable condition in a complex system, enough early warning time is required so that system administrators can prepare for intervention and maintenance as well as to pre-arrange needed parts and labor to take necessary corrective actions. Such rule-based systems struggle to produce accurate predictions and are prone to false-positive alerts that result in alert fatigue.

Advanced techniques are desired to timely and accurately predict time to failures or other conditions and remaining useful life of complex systems.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 GENERAL OVERVIEW
2.0 STRUCTURAL OVERVIEW
3.0 FUNCTIONAL OVERVIEW
4.0 HARDWARE OVERVIEW 1.0 General Overview A computer system and computer-implemented method are provided and are configured to use machine learning techniques to forecast predictions that indicate an event horizon of an entity. An 'event horizon' is the length of time from a given point in time until some event of interest, such as a system or equipment failure, exhaustion of a consumable, reaching a certain threshold in a process (e.g., achieving nuclear criticality), or breaching of a barrier (e.g., pressure/weight of water on a levee). An 'entity' represents a physical system, such as a machine, process, or environmental condition. In an embodiment, generating forecast predictions that indicate an event horizon of an entity may be accomplished using a server computer system that receives and stores signal data that represents observed data values from one or more sensors attached to one or more entities. The server computer system aggregates the signal data into feature vectors that represent one or more sets of signal data over a particular range of time. The feature vectors are stored as feature data in one or more digital data repositories. The server computer system also stores condition data characterizing conditions occurring on the one or more entities at particular moments in time. Each condition corresponds to a state of an entity, such as ramping up, shutting down, operating at half capacity, not producing any sound, or having a low toner value. Each condition also may be associated with specific feature vectors from the feature data or clusters of feature vectors from the feature data. The server computer system generates and stores label data that comprises a plurality of time values. Each time value indicates a difference in time between the occurrence of one condition and the occurrence of another condition. As an example, a time value may indicate a difference in time between an operational condition of a machine and a failure condition of a machine. The server computer system creates a training dataset by combining the feature data, the condition data, and the label data into a single dataset. The server computer system then partitions the training dataset into a plurality of target condition training datasets where each target condition training dataset corresponds to a distinct target condition. The server computer system trains a separate machine learning model on each target condition training dataset. The server computer system then utilizes the trained machine learning models to accept feature vectors as input and generate forecast values that each indicate an amount of time to an occurrence of a target condition associated with a particular entity as output. The server computer system accepts signal data at various points of time and produces forecast values that indicate a time to an occurrence of the target condition associated with the particular entity. The server computer system uses the predicted forecast values to cause one or more precautionary intervention actions to be executed at the particular entity.

Techniques discussed herein provide forecast estimates that are more accurate and precise than previously accomplished in the art. By partitioning a feature space by condition, machine learning models can be trained to produce highly accurate and more reliable forecast value predictions compared to previous techniques. The forecast predictions may also be used to generate and transmit commands that, when executed by an entity, modify the state of the entity for the purpose of reducing inefficiency and unsafe behaviors of the entity.

Additionally, techniques described herein provide a highly scalable system by providing lightweight and flexible trained machine learning models to predict an event horizon of an entity as opposed to data heavy, computation intensive, and error prone rule-based systems. Such techniques further provide procedures to interpret complex signal data in ways that can be used to reduce inefficiency and unsafe behaviors of an entity such as a machine.

2.0 Structural Overview

Figure 1:
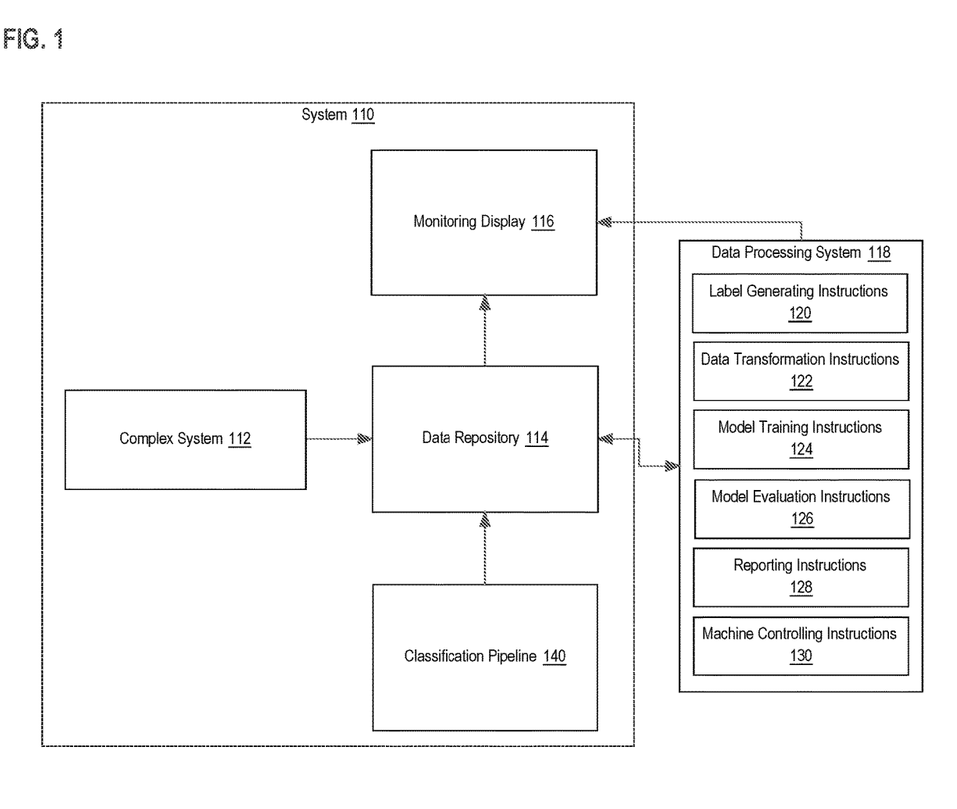
FIG. 1 is a block diagram that illustrates a networked environment where a monitoring system interacts with a complex system or other devices and components within the monitoring system.

FIG. 1 is a block diagram that illustrates a networked environment where a monitoring system interacts with a complex system or other devices and components within the monitoring system.

In an embodiment, data processing system 118 is a system configured to receive a data stream from system 110. System 110 may represent any system that is used to run and monitor an entity, such as an industrial machine. Another embodiment of system 110 may include computer systems programmed to monitor activity and real-time conditions of the human body. Yet other embodiments of the system 110 include computer systems programmed to monitor the activity and state of various software programs.

FIG. 1 depicts a sample arrangement of the system 110, which includes a complex system 112, data repository 114, and a monitoring display 116. In an embodiment, the complex system 112 may represent a complex industrial machine such as complex factory equipment, commercial vehicles, aircrafts, or any other complex machinery that utilizes multiple sensors to monitor the state of the machinery. In an embodiment, the complex system 112 may also represent a complex sensor package that includes multiple types of sensors designed to function as an activity tracker, such as wireless-enabled wearable technology devices.

In an embodiment, the complex system 112 may be communicatively coupled to the data repository 114 for the purposes of sending a data stream of signal data from multiple sensors attached to the complex system 112. The data stream of signal data may represent multiple data observations collected by the multiple sensors. The purpose of the multiple sensors on the complex system 112 is to record observations occurring at various points within the complex system 112. For example, if the complex system 112 is at power plant made up of multiple windmills that generate energy from the wind, then the multiple sensors may include: sensors that measure the rotational speed of each individual windmill, sensors that measure the electrical charge generated by each windmill, and sensors that measure the current storage levels of electricity generated by the electrical generators within the power plant. In another example, the complex system 112 may represent a wireless activity tracker. In this case, the multiple sensors may be configured to detect changes occurring to the wearer and positional changes based on movement. For instance, the set of sensors may include, but are not limited to, a global positioning sensor (GPS), a 3-axis accelerometer, a 3-axis gyroscope, a digital compass, an optical heart rate monitor, and an altimeter. In yet another example, the complex system 112 may represent a particular application, such as a commercial application. The particular application may include one or more computer classes that generate output, such as log output, for the particular computer application. The log output generating classes may be considered built-in instrumentation that reports the current state of multiple computer classes and objects invoked within the particular computer application.

In an embodiment, data processing system 118 is configured to receive a data stream of signal data from the signal data repository 114 and identify feature data comprising feature vectors related to the signal data and condition data comprising physical conditions related to the signal data. The data processing system 118 is further configured to send the feature data and the condition data to system, the data repository 114 or to the monitoring display 116 so that a user can better identify features and conditions related to the incoming signal data.

In an embodiment, the data repository 114 stores feature data. Feature data comprises feature vectors. Feature vectors represent sets of signal data over a particular range of time. In some embodiments, feature data comprises tuples with the columns time, entity, and feature vectors. Each tuple includes a time, an entity, and feature vectors associated with the respective time and entity. In one embodiment, feature data is generated based on signal data as further discussed herein.

In an embodiment, the data repository 114 stores condition data. Condition data comprises conditions occurring on one or more entities a particular moment in time. Each occurrence of a condition from the condition data may describe a particularly identified condition that occurred on a specific entity, such as a complex machine. Each condition corresponds to a state of a machine or a type of machine, such as ramping up, shutting down, operating at half capacity, not producing any sound, or having a low toner value. Each occurrence of a condition from the condition data may be assigned to or associated with one or more feature vectors from the feature data. In some embodiments, each condition is determined based on one or more feature vectors from the feature data. In some embodiments, condition data comprises tuples with the columns time, entity, and condition. Each tuple includes a time, an entity, and condition that is associated with the respective time and entity.

In some embodiments, a clustering-based approach is used to predict occurrences of conditions and generate condition data. In one embodiment, classification pipeline 140 provides instruction to generate condition data. Classification pipeline 140 may generate the condition data by receiving signal data, combining the signal data into feature vectors, grouping the feature vectors in clusters, and identifying conditions based on the clusters. In some embodiments, classification pipeline 140 is incorporated into data processing system 118.

The generation of feature vectors and conditions is further described in U.S. application Ser. No. 15/195,873, filed Jun.

28, 2016, the entire contents of which are incorporated by reference as if fully disclosed herein. The generation of conditions is further described in U.S. application Ser. No. 14/092,737, filed Nov. 27, 2013, the entire contents of which are incorporated by reference as if fully disclosed herein.

The data repository 114 may also be capable of sending either real-time data or stored data to the monitoring display 116 for the purposes of presenting data values to a user for monitoring purposes. Embodiments of the data repository 114 features are not limited to the features described above. The data repository 114 may be implemented using any commercially available monitoring programs and may utilize any monitoring features within the commercially available products.

In an embodiment, the monitoring display 116 represents a computer-implemented machine programmed to display any data received from the signal data repository 114. In an embodiment, the monitoring display 116 may be capable of directly receiving data input from data processing system 118.

In an embodiment, the data processing system 118 contains specially configured logic including, but not limited to, label generating instructions 120, data transformation instructions 122, model training instructions 124, model evaluation instructions 126, reporting instructions 128, and machine controlling instructions 130. Each of the foregoing elements is further described in structure and function in other sections herein. Each of the elements comprise executable instructions loaded into a set of one or more pages of main memory, such as RAM, in the data processing system 118 which when executed cause the data processing system 118 to perform the functions or operations that are described herein with reference to those modules. For example, the label generating instructions 120 may comprise executable instructions loaded into a set of pages in RAM that contain instructions which when executed cause performing the label generating instructions 120 that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the label generating instructions 120, data transformation instructions 122, model training instructions 124, model evaluation instructions 126, reporting instructions 128, and machine controlling instructions 130 also may represent one or more files or projects of source code that are digitally stored in a mass storage device such as non-volatile RAM or disk storage, in the data processing system 118 or a separate repository system, which when compiled or interpreted cause generating executable instructions which when executed cause the data processing system 118 to perform the functions or operations that are described herein with reference to those modules. In other words, the drawing figure may represent the manner in which programmers or software developers organize and arrange source code for later compilation into an executable, or interpretation into bytecode or the equivalent, for execution by the data processing system 118.

The label generating instructions 120 provide instructions to generate the label data based on feature data and condition data. The data transformation instructions 122 provide instruction to combine the feature data, the condition data, and the label data into a training dataset, partition the training dataset into multiple condition datasets, and also apply various transformations to data. The model training instructions 124 provide instructions to train machine learning models using partitioned training datasets. The model evaluation instructions 126 provide instructions to evaluate trained machine learning models to generate forecast values. The model evaluation instructions 126 provide further instructions to receive signal input data, generate feature input data comprising feature vectors based on the signal input data, determine a particular condition that the feature input data corresponds to, select a trained machine learning model of the plurality of trained machine learning models that corresponds to the particular condition, and evaluate the particular trained machine learning model based on the feature input data to generate a forecast value. The reporting instructions 128 provide instructions to report prediction output as forecast values associated with specific instances of feature data and condition data within a graphical user interface. The machine controlling instructions 130 provide instructions to generate and transmit commands that cause the execution of actions on one or more of the machines that are being monitored.

3.0 Functional Overview

Figure 2A:
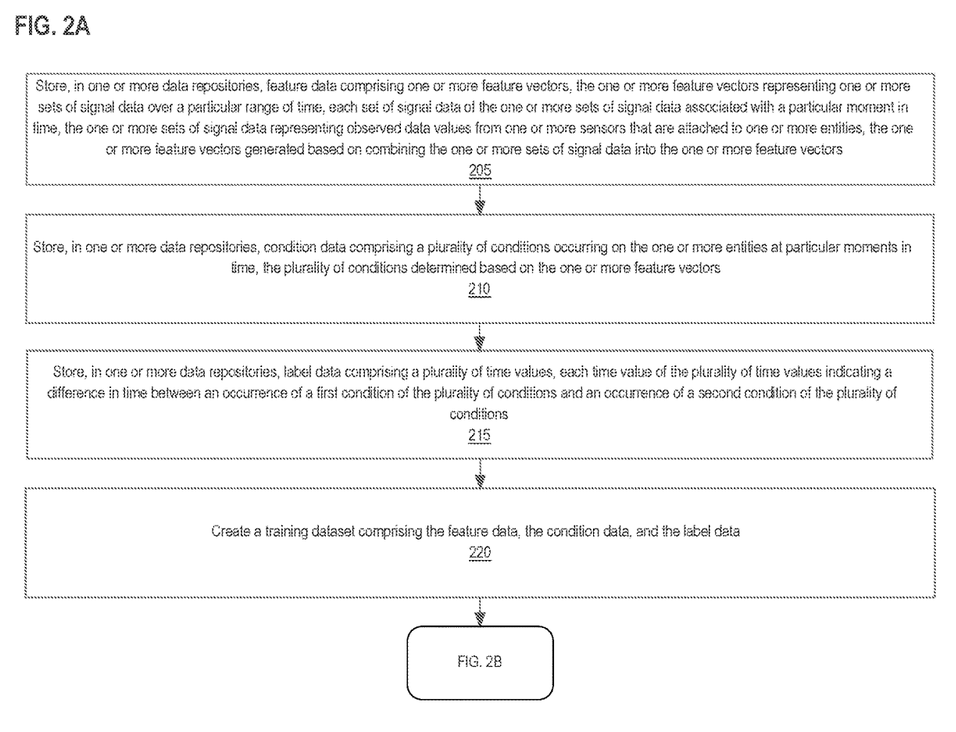
FIG. 2A is a flow diagram that depicts a process for using machine learning techniques to forecast predictions that indicate an event horizon of an entity.
Figure 2B:
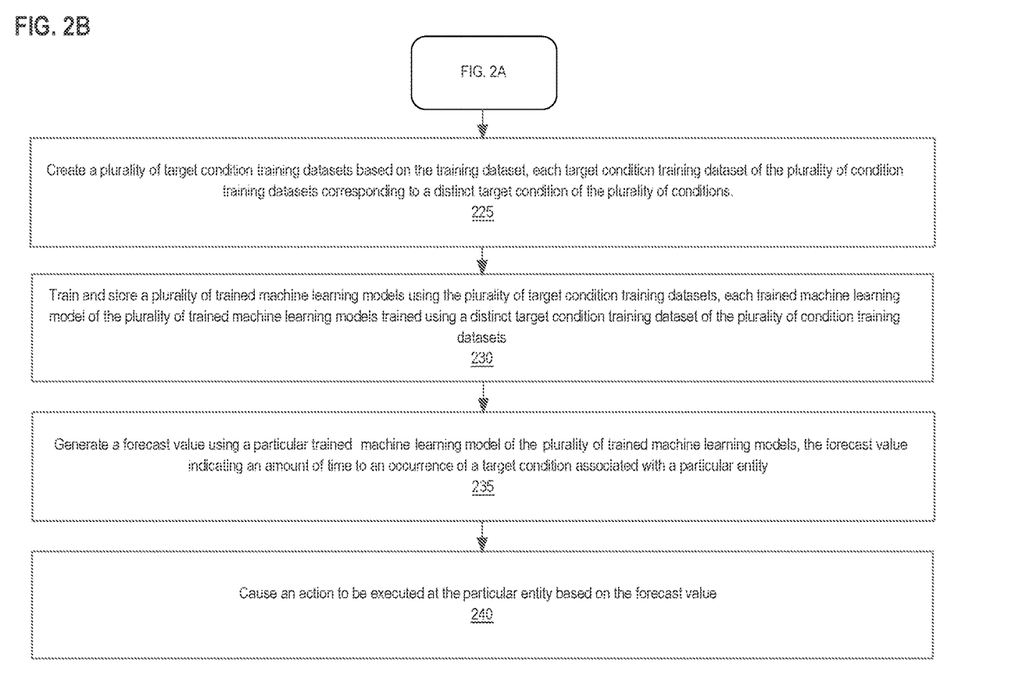
FIG. 2B is a flow diagram that depicts a process for using machine learning techniques to forecast predictions that indicate an event horizon of an entity.

FIG. 2A and FIG. 2B is a combined flow diagram that depicts a process for using machine learning techniques to generate forecast predictions that indicate an event horizon of an entity, such as a complex system. FIG. 2A and FIG. 2B may be implemented, in one embodiment, by programming the elements of the data processing system 118 to perform functions that are described in this section, which may represent disclosure of an algorithm for computer implementation of the functions that are described. For purposes of illustrating a clear example, FIG. 2A and FIG. 2B are described in connection with certain elements of FIG. 1. However, other embodiments of FIG. 2A and FIG. 2B may be practiced in many other contexts and references herein to units of FIG. 1 are merely examples that are not intended to limit the broader scope of FIG. 2A and FIG. 2B.

At step 205, the data processing system 118 is programmed or configured to store, in one or more data repositories, feature data comprising one or more feature vectors. The one or more feature vectors represent one or more sets of signal data over a particular range of time. The one or more sets of signal data represent observed data values from one or more sensors that are attached to an entity. Each set of signal data of the one or more sets of signal data is associated with a particular moment in time. The one or more feature vectors are generated based on combining the one or more sets of signal data into the one or more feature vectors.

In one embodiment, signal data may be defined as a digital stream of signals that depict different measured values from multiple sensors on the complex system 112. In an embodiment, the signal data may be received in the form of digital data sets that make up multiple measured values from multiple sensors for a given moment in time. For example, if the complex system 112 is an activity tracking device, a set of signal data for the activity tracking device may include, but is not limited to, a set of data values that measure acceleration, velocity, altitude, and orientation for the x, y, and z-axes at a given moment in time.

In one embodiment, the data processing system 118 aggregates the signal data sets into one or more feature vectors. In an embodiment, the data processing system 118 provides instruction to identify patterns from multiple signal data sets. Patterns are based upon variations across different signals and over a specific period of time. For instance, a condition of a particular piece of equipment within the complex system 112 at a specific time t may depend on different sets of signal values from one or more sensors over a period of time leading up to time t. The machine being in this condition may be represented by a set of signal data from time (t−x) to time t, where x is a specific duration of time such that (t−x) is a period in time that occurs before time t. Given a measurement frequency, each time period may cover a certain number measurements from each sensor, and the combination of multiple sets of measurements corresponding to multiple time points within that time period form a time series.

In an alternative embodiment, the data processing system 118 provides instruction to aggregate signal data sets to generate feature vectors using a recurrent neural network. For example, long short-term memory is a recurrent neural network architecture that contains long short-term memory blocks. A long short-term memory block may be described as a "smart" network unit that can remember a value for an arbitrary length to time. The long short-term memory blocks contain gates that determine when an input is significant enough to remember, when it should continue to remember or forget the value, and when it should output the value. In this context the long short-term memory network may transform the signal data set into a single sequence of feature vectors that captures time sequence patterns of the signal data as a whole.

At step 210, the data processing system 118 is programmed or configured to store, in one or more data repositories, condition data comprising a plurality of conditions occurring on the one or more entities at particular moments in time. The condition data may describe a particularly identified condition that occurred on an entity, such as a complex machine, at a moment in time. In one embodiment, each condition from the condition data may be assigned to or associated with one or more feature vectors from the feature data. In some embodiments, the plurality of conditions is determined based on the one or more feature vectors from the feature data.

At step 215, the data processing system 118 is programmed or configured to store, in one or more data repositories, label data comprising a plurality of time values. Each time value of the plurality of time values indicates a difference in time between an occurrence of a first condition of the plurality of conditions and an occurrence of a second condition of the plurality of conditions.

Figure 3:
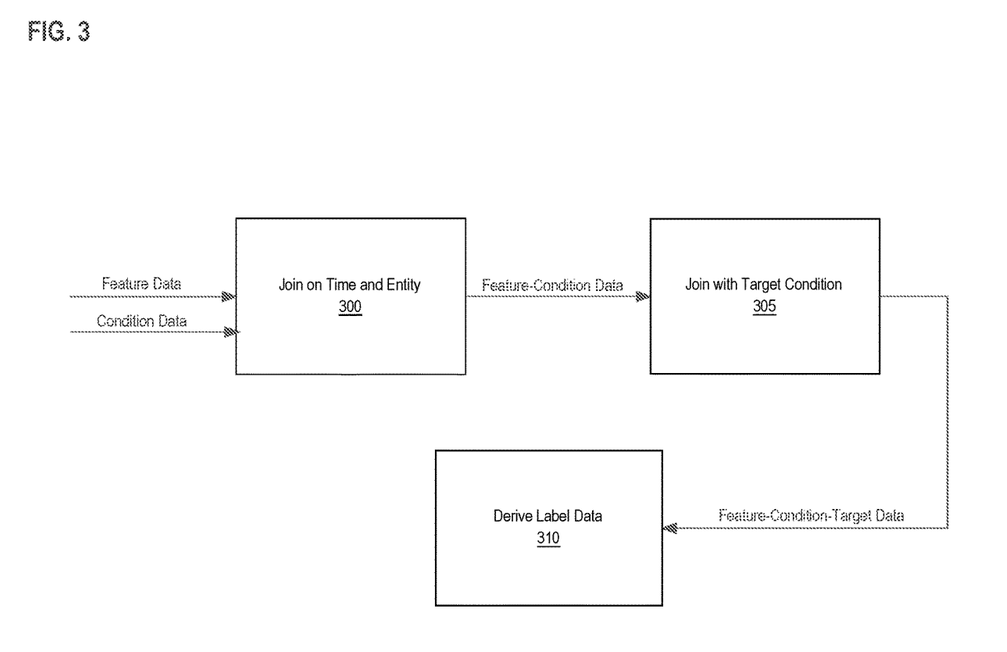
FIG. 3 is a block diagram that depicts a process for generating label data.

In an embodiment, the label generating instructions 120 provide instruction to generate the label data. FIG. 3 represents a sample embodiment of a procedure for generating label data.

At block 300, the label generating instructions 120 provide instructions to join the feature data and the condition data on a time dimension and entity dimension. In an embodiment, the feature data and the condition data specify dimensions, i.e. columns, for time and entity. For example, the feature data comprises a tuple with the columns time, entity, and feature vectors. As another example, the condition data comprises a tuple with the columns time, entity, and conditions. The label generating instructions 120 perform a join operation to join the feature data with the condition data where time and entity match. The result dataset of the join operation is referred to herein as 'feature-condition data'.

In some embodiments, each condition is represented as a pattern (e.g., speed is 50-60, pressure is 0-2), and each pattern is matched with the feature data so that specific occurrences of conditions on particular entities at particular times are identified in the feature data.

At block 305, the label generating instructions 120 provide instruction to join the feature-condition data with a next condition. This means using the timestamp of the features-condition data to find the next closest condition in the future. The join operation is performed to join the feature-condition data with a next condition. The result dataset of the join operation is referred to herein as 'feature-condition-target data'.

At block 310, the label generating instructions 120 provide instruction to derive label data from the feature-condition-target data. From the feature-condition-target data, a plurality of time values is calculated. In one embodiment, each time value comprises an interval between two different conditions from the condition data. In one embodiment, each time value of the plurality of time values indicates a difference in time between an occurrence of a first condition from the condition data to an occurrence of a second condition that is different from the first condition. In one embodiment, the two conditions do not occur sequentially. When the feature data covers occurrences of multiple conditions, different time values can be obtained from different pairs of the multiple conditions.

Returning to FIG. 2A, at step 220, a training dataset comprising the feature data, the condition data, and the label data is created. For example, the data transformation instructions provide instruction 122 to combine or organize the feature data, the condition data, and the label data into a training dataset. In some embodiments, creating the training dataset comprises formatting or organizing the feature data, the condition data, and the label data into a data structure that can be used to train one or more machine learning models. The feature data and the condition data are to be used as inputs for training machine learning models and the label data is to be used as an output for training machine learning models. In some embodiments, when the label data is derived as discussed with respect to block 310, the training dataset is created.

As an example, the training dataset comprises a plurality of data records. Each data record of the plurality of data records includes one or more feature vectors from the feature data, a target condition from the condition data, and a time value from the label data. For each data record, the time value indicates a time from a condition to the target condition specified in the respective data record. Because conditions are derived from feature vectors, the one or more feature vectors of each data record may indicate or be associated with an initial condition from which the time value of the respective data record is calculated.

In an embodiment, the data transformation instructions 122 provide instruction to apply a transformation to the training dataset including taking a symmetrical log of the feature data and the label data from the training dataset. Taking a symmetrical log of the feature data and the label data is defined as taking a log of the absolute value of the feature data and the label data. The purpose of this step is to ensure that feature vectors of the feature data and the time values of the label data are all positive numbers. Since forecast is about future state, forecasts ought to have a positive value. By ensuring that the forecast values are positive numbers, the likelihood of negative forecast values that are output by a trained machine learning model that is trained using the transformed training dataset is eliminated. In one embodiment, when the transformed trained dataset is used to train a regression model, the trained regression model becomes multiplicative and positive forecasts, i.e. outputs, are guaranteed.

Moving to FIG. 2B, at step 225, the data processing system 118 is programmed or configured to create a plurality of target condition training datasets based on the training dataset. Each target condition training dataset of the plurality of target condition training datasets corresponds to a distinct target condition of the plurality of conditions. For example, the data transformation instructions 122 provide instruction to partition the training dataset by condition so that there is a separate target condition training dataset that corresponds to each distinct target condition. The purpose of this step is to separate the training dataset into multiple training datasets so that a unique machine learning model can be trained on each target condition training dataset. Machine learning models that are trained per target condition training dataset produce predictions at a higher accuracy metric compared to globally trained models.

As an example, each target condition training dataset comprises a plurality of data records. Each data record of the plurality of data records comprises one or more feature vectors from the feature data and a time value from the label data. For each data record, the time value indicates a time from an initial condition that is derived from or associated with the one or more feature vectors that are included in the respective data record to the target condition that is associated with the respective target condition training dataset.

At step 230, the data processing system 118 is programmed or configured to train and store a plurality of trained machine learning models using the plurality of target condition training datasets. Each trained machine learning model of the plurality of trained machine learning models is trained using a distinct target condition training dataset of the plurality of target condition training datasets. Each trained machine learning model of the plurality of trained machine learning models corresponds to a distinct condition of the plurality of conditions. For example, the model training instructions 124 provide instruction to train each trained machine learning model of the plurality of trained machine learning models using a distinct target condition training dataset of the plurality of target condition training datasets. As discussed above, by training each trained machine learning model using a separate training dataset for each condition, each trained model will predict output values at a higher accuracy compared to a single global model.

In some embodiments, the machine learning algorithm used to train the plurality of machine learning models comprises a linear regression algorithm. In some embodiments, the machine learning algorithm used to train the plurality of machine learning models comprises at least one of a gradient boosting regression algorithm or a neural network.

In an embodiment, during training, feature vectors from the feature data are used as inputs and time values from the label data are used as outputs. Thus, once trained, each trained machine learning model will accept feature vectors as input and produce time values as output.

In some embodiments, for training a machine learning model comprising a gradient boosting regression algorithm, each target condition training dataset is modified to fit a gradient boosting regression algorithm. In one embodiment, for each target condition training dataset, one or more feature vectors from each data record of the respective target condition training dataset are assembled into an array-like data structure that will serve as input samples for training the respective machine learning model. Time values from each data record of the respective target condition training dataset are assembled into an array-like data structure that will serve as target values for training the respective machine learning model. Other parameters can be set to default values.

In some embodiments, for training a machine learning model comprising a neural network, each target condition training dataset is modified to fit a neural network. In one embodiment, for each target condition training dataset, one or more feature vectors from each data record of the respective target condition training dataset are assembled into an array-like data structure that will serve as input samples for training the respective machine learning model. Time values from each data record of the respective target condition training dataset are assembled into an array-like data structure that will serve as target values for training the respective machine learning model. Other parameters can be set to default values.

In some embodiments, the model training instructions 124 provide instruction to apply cross validation techniques for hyperparameter tuning during training. In some embodiments, cross validation techniques are performed whenever appropriate with algorithms such as Gradient Boosting Regressor (GBR) or Neural Network to choose hyperparameters such as, in case of GBR, learning rate and no_of_estimators that minimize the chosen criterion function, for instance: MSE or mean squared error for GBR, on the training data without overfitting.

In some embodiments, the model training instructions 124 provide instruction to determine a confidence score for each trained machine learning model of the plurality of machine learning models. A confidence score comprises an accuracy metric of a trained machine learning model of the plurality of trained machine learning models, and subsequently how much confidence to put into the forecasts of the respective trained machine learning model. Because each trained machine learning model corresponds to a distinct condition, a confidence score directly depends on a condition for which a trained machine learning model corresponds.

The model training instructions 124 provide instruction to determine a confidence score for a trained machine learning model by using a validation hold-out dataset. In one embodiment, to determine a confidence score for a trained machine learning model, the symmetric mean absolute percentage error (SMAPE), known to someone skilled in the art, is calculated for the trained machine learning model. The formula: 1−(SMAPE/2) is then used to determine the confidence score for the respective trained machine learning model. The determined confidence score is then assigned to the respective trained machine learning model.

At step 235, the data processing system 118 is programmed or configured to, using a particular trained machine learning model of the plurality of trained machine learning models, generate a forecast value that indicates an amount of time to an occurrence of a target condition associated with a particular entity. The forecast value is generated by evaluating a particular trained machine learning model of the plurality of trained machine learning models. A target condition may be specified by a system administrator. A trained machine learning model of the plurality of trained machine learning models is selected to be evaluated based on the target condition. For example, if it is determined that the particular trained machine learning model is associated with a distinct target condition that matches the target condition, the particular trained machine learning model is selected for generating the forecast value.

In some embodiments, the target condition comprises a failure condition that indicates a failure of an entity, such as a failure of a machine. When the target condition is a failure condition, the forecast value indicates a time to the failure condition from the condition associated with the particular trained machine learning model that generated the forecast value, herein referred to as a 'time-to-failure'.

As an example of step 235, the model evaluation instructions 126 provide instruction to receive signal input data, generate feature input data comprising feature vectors based on the signal input data similar to how signal data is combined into feature data as discussed with respect to step 305, select a particular trained machine learning model of the plurality of trained machine learning models that corresponds to a specified target condition, and evaluate the particular trained machine learning model based on the feature input data to generate a forecast value.

In an embodiment, the data transformation instructions 122 provide instruction to apply a transformation to the forecast value including taking an exponent of the forecast value. The purpose of this step is to perform a reverse transformation of the step of taking the symmetrical log of the feature data and the label data from the training dataset. As an example, in a scenario where a linear regression model is learned to be the function: y=x−10, the function would predict negative values for x<10. By taking the exponent, (ie y=e^(x−10)), it is guaranteed that the prediction will always be positive.

In an embodiment, the data transformation instructions 122 provide instruction to apply a probabilistic smoothing filter to the forecast value. The probabilistic smoothing filter may be applied to the forecast value after the exponent of the forecast value is taken. The purpose of this step is to reduce the volatility of the forecast values. For example, before a probabilistic smoothing filter is applied to the forecast values, the forecast values can fluctuate widely from one moment of time to another because of coefficients of a regression formula. However, it is the expectation of a user to see a smooth monotonically decreasing value over time, unless an intervention takes place. A probabilistic smoothing filter produces a smooth monotonically decreasing value over time to match the expectation of the user.

In some embodiments, the probabilistic smoothing filter comprises a Kalman filter. In some embodiments, the Kalman filter comprises learned parameters including a measurement uncertainty parameter and a process uncertainty parameter. The measurement uncertainty parameter is determined by evaluating a trained machine learning model on a hold-out validation dataset during model training. In one embodiment, the process uncertainty parameter is set to one second. In some embodiments, a customization to the Kalman filter is provided for resetting the state of the Kalman filter after a failure condition has occurred, i.e. when the forecast value is negative. The purpose of this customization is because forecasting past failure conditions has no utility to the user and the algorithm should instead shift focus to the next failure condition.

In some embodiments, the signal processing system 120 implements instructions, from the reporting instructions 128, to report forecast values that are generated in step 325. Reporting instructions 128 may also report confidence values that are associated with the condition or trained machine learning model that generated the forecast value. The forecast value may comprise a prediction output that may be reported to a computer user, other computer, machine, or device. Prediction output may be configured as a graphical representation. In various embodiments, prediction output may be provided in reports printed by computer, graphical displays that the computer drives a computer display device to display, indicator displays, text messages, application alerts, and other messages or notifications.

In an embodiment, the reporting instructions 128 may provide instruction to report the prediction output as forecast values associated with specific instances of feature data and condition data within a graphical user interface. In an embodiment, the graphical interface may be represented as a time graph covering a range of time starting with the first received signal data and ending with the last received signal data.

At step 240, the data processing system 118 is programmed or configured to cause an action to be executed at the particular entity based on the forecast value. For example, in some embodiments, the machine controlling instructions 130 may provide instruction to, based upon the forecast value that is generated, generate and transmit commands that cause the execution of actions on one or more of the machines that are being monitored. In an embodiment, any forecast values generated by the model evaluation instructions 126 may be associated with machine instructions that are sent to the system 110 for the purposes of modifying the state of the system 110.

For example, if a forecast value is less than a threshold value defined by an administrator, the machine controlling instructions 130 generate machine instructions, such as control signals to be directly executed by the entity for which the event horizon is being estimated, and transmit the machine instructions to the system 110 for the purposes of shutting down the system 110 to prevent damage to the entity. As an example, if a forecast value indicating a time-to-failure of a specific machine is 59 minutes and a threshold value is set to 65 minutes, the forecast value is less than the threshold and machine instructions are generated and transmitted to the system to cause the execution an action such as shutting down the machine. Such automatic generation, transmission and execution of machine instructions that control the state of entities improve the safety, reliability, efficiency, and quality of production.

In some embodiments, confidence values that are associated with the trained machine learning model that generated the forecast value may also be compared to threshold values set by the administrator to determine what machine instructions are generated and transmitted to the system 110. As an example, if a confidence value of a trained machine learning model associated with a particular condition is less than a threshold value provided by an administrator, the machine controlling instructions 130 may choose not to generate and transmit machine instructions to the system 110 because the confidence value is too low. On the contrary, if the confidence value satisfies the threshold value, the machine instructions are generated and transmitted to the system to cause the execution of an action.

In one embodiment, instead of training machine learning models per target condition training dataset, target condition training datasets can be further segmented by entity, i.e. machine type. By training machine learning models on such specific datasets, the accuracy of predictions can be further enhanced.

Techniques discussed herein provide forecast estimates that are more accurate and precise than previously accomplished in the art. Previous techniques that were used to predict forecast values do not include any notion of conditions and do not partition training datasets by condition. By partitioning a feature space by condition, machine learning models can be trained to produce highly accurate and more reliable forecast value predictions compared to previous techniques. The forecast predictions may also be used to generate and transmit commands that, when executed by an entity, modify the state of the entity for the purpose of reducing inefficiency and unsafe behaviors of the entity.

Figure 4:
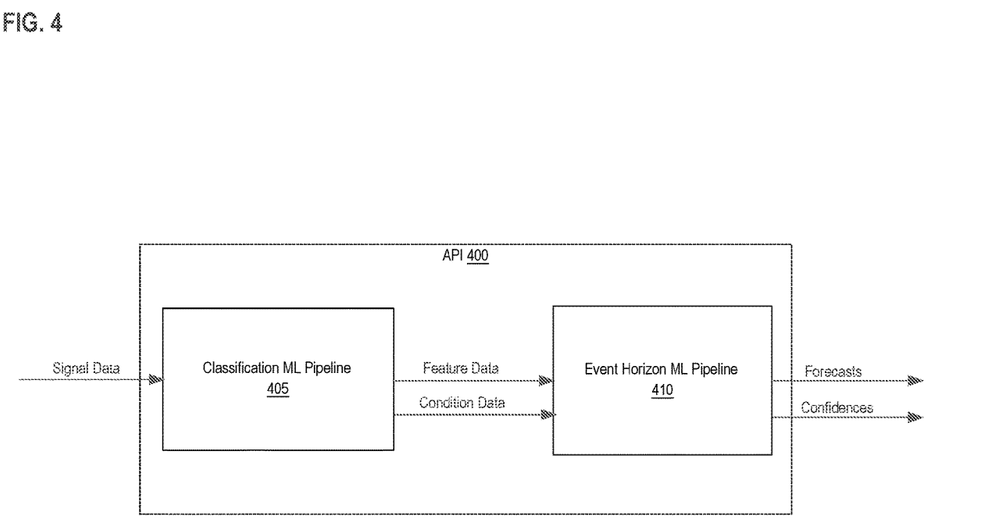
FIG. 4 is a block diagram that depicts an application programming interface (API) for implementing machine learning techniques to identify event horizon predictions for an entity.

FIG. 4 is a block diagram that depicts an application programming interface (API) for implementing machine learning techniques to identify event horizon predictions for an entity.

When signal data is received via the API 400, the classification ML pipeline 405 generates feature data comprising feature vectors and condition data comprising conditions based on the signal data. In one embodiment, the functionality of the classification ML pipeline 405, including the generation of feature data and condition data, is further described in part by U.S. application Ser. No. 15/195,873, filed Jun. 28, 2016, the entire contents of which are incorporated by reference as if fully disclosed herein.

The event horizon ML pipeline 410 comprises instructions to perform all steps from FIG. 2 and FIG. 3. For example, the event horizon ML pipeline 410 includes instructions to generate label data based on feature data and condition data that are received from the classification ML pipeline 405. The event horizon ML pipeline 410 also includes instructions to train machine learning models using the feature data, the condition data and the label data, and apply the trained machine learning models to produce forecast values and confidence scores, as discussed with respect to FIG. 2 and FIG. 3.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
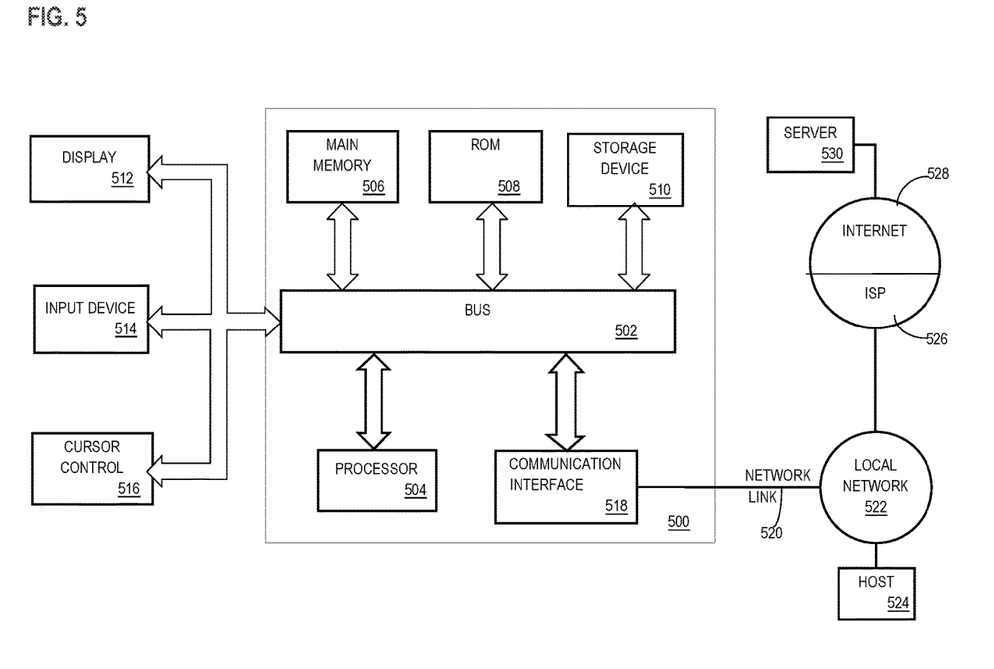
FIG. 5 illustrates an example computer system that may be configured to implement, individually or in cooperation with other computer systems, various technical steps described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing, in one or more digital data repositories, feature data comprising one or more feature vectors, the one or more feature vectors representing one or more sets of signal data over a particular range of time, the one or more sets of signal data representing observed data values from one or more sensors that are attached to one or more entities, each set of signal data of the one or more sets of signal data associated with a particular moment in time, the one or more feature vectors generated based on combining the one or more sets of signal data into the one or more feature vectors;
    storing, in one or more digital data repositories, condition data comprising a plurality of conditions occurring on the one or more entities at particular moments in time, the plurality of conditions determined based on the one or more feature vectors;
    storing, in one or more digital data repositories, label data comprising a plurality of time values, each time value of the plurality of time values indicating a difference in time between an occurrence of a first condition of the plurality of conditions and an occurrence of a second condition of the plurality of conditions;
    creating a training dataset comprising the feature data, the condition data, and the label data;
    creating a plurality of target condition training datasets based on the training dataset, each target condition training dataset of the plurality of target condition training datasets having a distinct target condition of the plurality of conditions as the second condition in the label data;
    training and storing a plurality of trained machine learning models using the plurality of target condition training datasets, each trained machine learning model of the plurality of trained machine learning models trained using a distinct target condition training dataset of the plurality of target condition training datasets, each trained machine learning model of the plurality of trained machine learning models corresponding to a distinct target condition of the plurality of conditions;
    using a particular trained machine learning model of the plurality of trained machine learning models, generating a forecast value that indicates an amount of time from a time associated with a set of input feature vectors to an occurrence of a target condition associated with a particular entity;
    based on the forecast value, causing an action to be executed at the particular entity.

2. The method of claim 1, further comprising:
    generating feature-condition data by combining the feature data with the condition data based on a time dimension and an entity dimension that are associated with each feature vector of the one or more of feature vectors and each condition of the plurality of conditions.

3. The method of claim 2, further comprising:
    generating feature-condition-target data by combining the feature-condition data with a next condition of the plurality of conditions;
    determining the plurality of time values of the label data by calculating, for each time value of the plurality of time values, a difference in time between an occurrence of a first condition of the plurality of conditions and an occurrence of the next condition of the plurality of conditions.

4. The method of claim 1, further comprising:
    applying a first transformation to the training to eliminate negative data values of the feature data and the label data from the training dataset.

5. The method of claim 4, further comprising:
    after generating the forecast value, applying a second transformation to the forecast value including taking an exponent of the forecast value corresponding to the first transformation.

6. The method of claim 1, further comprising:
    determining a confidence score for each condition of the plurality of conditions, each respective confidence score indicating an accuracy metric of the trained machine learning model of the plurality of trained machine learning models that is associated with the respective condition.

7. The method of claim 1, further comprising:
applying a third transformation to the forecast value including applying a probabilistic smoothing filter to the forecast value.

8. The method of claim 7, wherein the probabilistic smoothing filter comprises a Kalman filter.

9. The method of claim 1, wherein each trained machine learning model of the plurality of trained machine learning models is trained using a regression algorithm.

10. The method of claim 9, wherein the regression algorithm comprises a linear regression algorithm or a gradient boosting algorithm.

11. The method of claim 1, wherein the second condition of the plurality of conditions comprises a failure condition.

12. The method of claim 1, further comprising:
determining that the forecast value is less than a threshold value, and in response, causing an action to be executed at the particular entity.

13. One or more non-transitory, computer-readable storage media storing instructions which when executed cause one or more processors to perform a method, the method comprising:
storing, in one or more digital data repositories, feature data comprising one or more feature vectors, the one or more feature vectors representing one or more sets of signal data over a particular range of time, the one or more sets of signal data representing observed data values from one or more sensors that are attached to one or more entities, each set of signal data of the one or more sets of signal data associated with a particular moment in time, the one or more feature vectors generated based on combining the one or more sets of signal data into the one or more feature vectors;
storing, in one or more digital data repositories, condition data comprising a plurality of conditions occurring on the one or more entities at particular moments in time, the plurality of conditions determined based on the one or more feature vectors;
storing, in one or more digital data repositories, label data comprising a plurality of time values, each time value of the plurality of time values indicating a difference in time between an occurrence of a first condition of the plurality of conditions and an occurrence of a second condition of the plurality of conditions;
creating a training dataset comprising the feature data, the condition data, and the label data;
creating a plurality of target condition training datasets based on the training dataset, each target condition training dataset of the plurality of target condition training datasets having a distinct target condition of the plurality of conditions as the second condition in the label data;
training and storing a plurality of trained machine learning models using the plurality of target condition training datasets, each trained machine learning model of the plurality of trained machine learning models trained using a distinct target condition training dataset of the plurality of target condition training datasets, each trained machine learning model of the plurality of trained machine learning models corresponding to a distinct target condition of the plurality of conditions;
using a particular trained machine learning model of the plurality of trained machine learning models, generating a forecast value that indicates an amount of time from a time associated with a set of input feature vectors to an occurrence of a target condition associated with a particular entity;
based on the forecast value, causing an action to be executed at the particular entity.

14. The one or more non-transitory, computer-readable storage media of claim 13, the method further comprising:
generating feature-condition data by combining the feature data with the condition data based on a time dimension and an entity dimension that are associated with each feature vector of the one or more of feature vectors and each condition of the plurality of conditions.

15. The one or more non-transitory, computer-readable storage media of claim 14, the method further comprising:
generating feature-condition-target data by combining the feature-condition data with a next condition of the plurality of conditions;
determining the plurality of time values of the label data by calculating, for each time value of the plurality of time values, a difference in time between an occurrence of a first condition of the plurality of conditions and an occurrence of the next condition of the plurality of conditions.

16. The one or more non-transitory, computer-readable storage media of claim 13, further comprising:
applying a first transformation to the training to eliminate negative data values of the feature data and the label data from the training dataset.

17. The one or more non-transitory, computer-readable storage media of claim 16, the method further comprising:
after generating the forecast value, applying a second transformation to the forecast value including taking an exponent of the forecast value corresponding to the first transformation.

18. The one or more non-transitory, computer-readable storage media of claim 13, the method further comprising:
determining a confidence score for each condition of the plurality of conditions, each respective confidence score indicating an accuracy metric of the trained machine learning model of the plurality of trained machine learning models that is associated with the respective condition.

19. The one or more non-transitory, computer-readable storage media of claim 13, the method further comprising:
applying a third transformation to the forecast value including applying a probabilistic smoothing filter to the forecast value.

20. The one or more non-transitory, computer-readable storage media of claim 19, wherein the probabilistic smoothing filter comprises a Kalman filter.

21. The one or more non-transitory, computer-readable storage media of claim 13, wherein each trained machine learning model of the plurality of trained machine learning models is trained using a regression algorithm.

22. The one or more non-transitory, computer-readable storage media of claim 21, wherein the regression algorithm comprises a linear regression algorithm or a gradient boosting algorithm.

23. The one or more non-transitory, computer-readable storage media of claim 13, wherein the second condition of the plurality of conditions comprises a failure condition.

24. The one or more non-transitory, computer-readable storage media of claim 13, the method further comprising:

determining that the forecast value is less than a threshold value, and in response, causing an action to be executed at the particular entity.

\* \* \* \* \*